June 29, 1937.  G. F. PETERSON  2,085,229
STORAGE BATTERY
Filed Nov. 24, 1934

*INVENTOR.*
GROVER F. PETERSON.
BY *Philip H. Allen*
*ATTORNEY.*

Patented June 29, 1937

2,085,229

UNITED STATES PATENT OFFICE 2,085,229

STORAGE BATTERY

Grover F. Peterson, Piedmont, Calif., assignor of one-fifth to Malcolm C. Bruce, San Francisco, Calif.

Application November 24, 1934, Serial No. 754,621

5 Claims. (Cl. 173—259)

My invention relates to electrolytic storage batteries and the like, and more particularly to the provision of means for preventing corrosion at the terminals or posts thereof.

In the usual type of electric storage battery having a plurality of plates connected to the respective positive and negative terminals and immersed within an electrolyte, corrosion eventually occurs particularly around the positive terminal or post because of seepage of the electrolyte or battery acid from within the battery to the connection between the post and the cable or conductor clamp. The deleterious effects of such corrosion, such as increased resistance in the battery circuit and eating away of the post and clamp are obvious.

My invention has for its object the provision of improved means for preventing corrosion at the terminals of storage batteries.

Another object of my invention is the provision of an improved battery terminal structure which eliminates corrosion.

Another object of my invention is the provision of an attachment for the terminals of a standard battery which is constructed to prevent corrosion at such terminals.

Another object of my invention is the provision of an improved battery terminal structure which will promote long life and efficient operation of the battery.

Other objects will appear as the description progresses.

Figure 2 is a full-size elevational view, partly in section, of a standard battery terminal with an attachment constructed according to my invention secured thereto.

Figure 3 is a plan view of the structure shown in Figure 2 with the cable and cable clamp omitted.

Figure 4 is a plan view of the structure shown in Figure 2.

The improved storage battery terminal structure of my invention comprises generally the provision of means for mounting the cable connector or clamp in a position spaced from the adjacent or top wall of the battery, the mounting means having abutment means forming a seat which positively prevents the positioning of the cable clamp too close to the battery wall.

Figure 1:
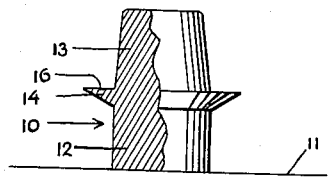
Figure 1 is a full-size side elevational view, partly in section, of a battery terminal, and illustrates one form of my invention.

Figure 1 illustrates the invention as applied in the initial construction of a storage battery.

The terminal structure includes post or terminal 10 of lead or a lead alloy, which projects from within the battery through wall 11 thereof. Post 10 is preferably of integral construction and has intermediate cylindrical portion 12 extending from top wall 11, and frusto-conical or tapered end portion 13. At the large end or base of end portion 13, abutment means is provided in the form of annular flange 14, having flat upper surface 16 to form a seat for a conventional cable clamp (not shown). Flange 14 preferably tapers inwardly from its outer edge. Flange 14, as illustrated, has an annular width of one-fourth inch and is spaced substantially one-half inch from wall 11. Above flange 14, end portion 13 is dimensioned similarly to standard battery posts having a height of five-eighths inch, a small diameter of approximately five-eighths inch, and a large diameter of approximately three-fourths inch equal to the diameter of cylindrical portion 12.

Thus, it is seen that an abutment is formed intermediate the length of post 10 which forms a seat to maintain the cable clamp spaced from adjacent wall 11 of the battery, whereby cylindrical portion 12 is left open. The spacing of the connection joint between the post and the cable clamp protects such joint from any of the battery acid which creeps up around the post from within the battery by capillary action, or any acid which is spilled on the battery, by allowing evaporation of such acid before it can reach such joint. Flange 14 not only positively maintains the selected spacing, but by virtue of the additional surface provided thereby, enables closer spacing of the cable clamp to the battery wall than would otherwise be desirable.

Figure 2:
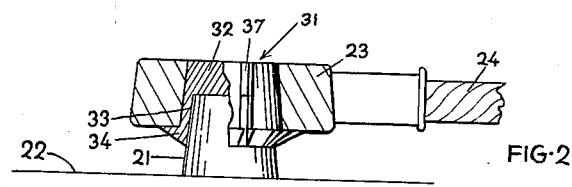
Figures 2 through 4 illustrate a second form of my invention as it is applied to a battery terminal of standard construction.
Figure 3:
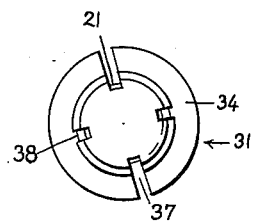
Figure 4:
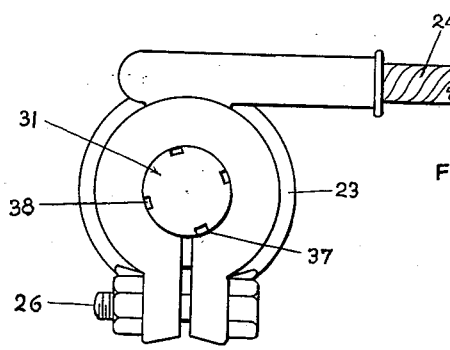

Figures 2 through 4 illustrate a second form of the invention as embodied in an attachment for a terminal or post of a standard battery. Standard battery post 21 (Figure 2) of frusto-conical shape and dimensioned similarly to end portion 13 of post 10 (Figure 1), projects through wall 22 (Figure 2) of the standard battery in the usual manner, and normally has clamp or connector 23 (Figures 3 and 4) for cable 24 secured thereon by means of bolt 26. In accordance with my invention, anti-corrosion attachment or fitting 31 is interposed between post 21 and clamp 23.

Anti-corrosion attachment or member 31 (Figures 2 and 3) is generally cup-shaped and is integrally formed, preferably of a lead alloy consisting of lead and antimony. Attachment 31 has solid end portion or abutment 32 from which wall 33 extends downwardly terminating in annular flange 34. The outer side surface of the attachment formed by end portion 32 and wall 33 is frusto-conical and receives clamp 23 which engages annular seat 36 formed by flange 34. Within attachment 31, end portion 32 and the inner frusto-conical surface of wall 33 form a recess which receives post 21. Wall 33 is formed by virtue of the overlapping relation of the frusto-conical side surfaces. To facilitate fitting of attachment 31 over post 21 and to insure good contact therebetween, respective opposed pairs of longitudinal slots 37, 38 are provided in attachment 31. Slots 37 extend throughout the length of the attachment, while slots 38 terminate at seat 36. By virtue of slots 37, 38, attachment 31 can be contracted radially by tightening bolt 26 to fit varying sizes of battery posts, which may occur because of wear on the posts in removing and replacing the battery clamp.

In constructing attachment 31, the recess therein is dimensioned to fit snugly over an unworn standard battery post and the outer dimensions of the attachment are identical with, or as close to the dimensions of such standard post as can be obtained while providing ample strength in wall 33. I have found that satisfactory results can be obtained with the lower end of wall 33 below flange 34 positioned substantially one-fourth inch from the adjacent wall 22 of the battery. Thus, the anti-corrosion properties are obtained with sufficient overlap along wall 33 between clamp 23 and post 21 to obtain a firm connection in the terminal structure.

While I have described my invention with reference to certain particular embodiments thereof, it is obvious that various changes in form and structure can be made without departing from the principle of my invention. Therefore, my invention is to be limited only by the scope of the appended claims.

I, therefore, claim as my invention:

1. An attachment for preventing corrosion at a terminal of a battery, comprising a cup-shaped member of integral construction, the recess at the open end of said member having a solid end surface and a substantially frusto-conical side surface, the outer side surface of said member being substantially frusto-conical and overlapping said recess side surface, and an annular flange at the base of said outer side surface around said open end and having a flat seat joining said outer side surface, said recess being adapted to receive snugly the standard post of a battery with said flange spaced from the adjacent wall of said battery by the engagement of said solid end surface with the end of the standard post, and said outer side surface being adapted to receive a cable connector with the bottom surface thereof engaging said seat.

2. An attachment for preventing corrosion at a terminal of a storage battery, comprising a cup-shaped member of integral construction, the recess at the open end of said member having a solid end surface and a substantially frusto-conical side surface, the outer side surface of said member being substantially frusto-conical and overlapping said recess side surface, and an annular flange at the base of said outer side surface around said open end and having a flat seat joining said outer side surface, peripherally spaced longitudinal slots in said member to provide for radial contraction and expansion thereof, said recess being adapted to receive snugly the standard post of a battery with said flange spaced from the adjacent wall of said battery by the engagement of said solid end surface with the end of the standard post, and said outer side surface being adapted to receive a cable connector with the bottom surface thereof engaging said seat.

3. An anti-corrosion attachment for a battery terminal comprising a member having a recess to receive said terminal, an abutment to engage the end of said terminal, and abutment means to seat a cable connector with the inner surface of the cable connector engaging the side wall of the member in overlapping relation with respect to said recess, said abutment positioning said attachment with respect to the terminal to provide an open space around said terminal between said attachment and the battery.

4. An anti-corrosion attachment for a battery terminal comprising a member having a recess to receive said terminal, an abutment to engage the end of said terminal, and abutment means to seat a cable connector with the inner surface of the cable connector engaging the side wall of the member in overlapping relation with respect to said recess, said abutment positioning said attachment with respect to the terminal to provide an open space around said terminal for substantially one-fourth of an inch between said attachment and the battery.

5. An anti-corrosion attachment for a battery terminal comprising a substantially cup-shaped member having the recess thereof formed to receive snugly the standard terminal of a battery and terminating in an end surface forming an abutment to engage the end of the terminal, and having an annular flange around the base thereof providing a flat seat to receive a cable connector engaged with the outer side surface of said member, the spacing between said abutment forming end surface and said flange providing for an open space around the terminal between the attachment and the adjacent wall of the battery.

GROVER F. PETERSON.